US012485960B2

(12) United States Patent
Yamashita et al.

(10) Patent No.: US 12,485,960 B2
(45) Date of Patent: Dec. 2, 2025

(54) STEERING CONTROL DEVICE

(71) Applicants: Toyota Jidosha Kabushiki Kaisha, Toyota (JP); JTEKT CORPORATION, Kariya (JP)

(72) Inventors: Yosuke Yamashita, Nagoya (JP); Masaharu Yamashita, Toyota (JP); Kenji Shibata, Nagoya (JP); Koichi Nishimura, Toyota (JP); Takahito Ishino, Numazu (JP); Toru Takashima, Susono (JP); Shintaro Takayama, Toyota (JP); Yuji Fujita, Okazaki (JP); Koji Anraku, Okazaki (JP); Kenichi Abe, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 446 days.

(21) Appl. No.: 18/304,666

(22) Filed: Apr. 21, 2023

(65) Prior Publication Data

US 2023/0339537 A1 Oct. 26, 2023

(30) Foreign Application Priority Data

Apr. 26, 2022 (JP) .................................. 2022-072209

(51) Int. Cl.
*B62D 6/02* (2006.01)
*B62D 5/00* (2006.01)
(Continued)

(52) U.S. Cl.
CPC ............... *B62D 6/02* (2013.01); *B62D 5/001* (2013.01); *B62D 5/003* (2013.01); *B62D 5/008* (2013.01);
(Continued)

(58) Field of Classification Search
CPC .......... B62D 6/02; B62D 5/008; B62D 5/046; B62D 5/001; B62D 5/003; B62D 6/002; B62D 5/0481; B62D 6/00
See application file for complete search history.

(56) References Cited

U.S. PATENT DOCUMENTS 5,257,191 A * 10/1993 Takehara ............. B62D 7/1581
180/404
7,406,374 B2 * 7/2008 Ono ....................... B62D 6/003
180/443

(Continued)

FOREIGN PATENT DOCUMENTS

CN 101445125 A 6/2009
CN 107733316 A 2/2018
(Continued)

*Primary Examiner* — Timothy Wilhelm
(74) *Attorney, Agent, or Firm* — Sughrue Mion, PLLC (57) ABSTRACT

A steering control device is configured to control a steering device that changes a transmission ratio between an operation angle of an operation member and a steering angle of a steerable wheel. The steering control device includes: communication lines for transmitting vehicle speed information; and calculators communicably connected to each other and individually connected to the communication lines. Each calculator calculates the transmission ratio based on the vehicle speed information received via a corresponding one of the communication lines and determines whether the received vehicle speed information is valid. When at least one of the calculators determines that the vehicle speed information is not valid, each calculator changes control for calculating the transmission ratio from a vehicle-speed responsive control in which the transmission ratio is calculated based on the vehicle speed information to a specific control in which the transmission ratio is calculated not based on the vehicle speed information.

10 Claims, 4 Drawing Sheets

(51) Int. Cl.
  *B62D 5/04*   (2006.01)
  *B62D 6/00*   (2006.01)
(52) U.S. Cl.
  CPC ........... *B62D 5/046* (2013.01); *B62D 5/0481* (2013.01); *B62D 6/00* (2013.01); *B62D 6/002* (2013.01)

(56) References Cited

U.S. PATENT DOCUMENTS

| | | | | |
|---|---|---|---|---|
| 7,493,984 | B2* | 2/2009 | Ono | B62D 5/008 |
| | | | | 180/404 |
| 7,575,092 | B2* | 8/2009 | Endo | B62D 5/049 |
| | | | | 180/405 |
| 8,112,204 | B2* | 2/2012 | Yamada | F16H 61/12 |
| | | | | 477/34 |
| 10,604,175 | B2* | 3/2020 | Patel | B62D 5/0484 |
| 11,066,095 | B2* | 7/2021 | Kodera | B62D 6/02 |
| 2004/0079578 | A1* | 4/2004 | Kurishige | B62D 5/0466 |
| | | | | 180/446 |
| 2009/0143942 | A1 | 6/2009 | Matsushita et al. | |
| 2018/0043928 | A1 | 2/2018 | Fujita et al. | |
| 2020/0062294 | A1 | 2/2020 | Kodera et al. | |
| 2022/0097761 | A1 | 3/2022 | Kakimoto et al. | |

FOREIGN PATENT DOCUMENTS

| | | |
|---|---|---|
| CN | 114312983 A | 4/2022 |
| JP | 2020-029194 A | 2/2020 |

\* cited by examiner

FIG.1

VEHICLE FRONT SIDE
LEFT ←→ RIGHT
VEHICLE REAR SIDE

STEERING CONTROL DEVICE

REFERENCE TO RELATED APPLICATIONS

This application claims priority from Japanese Patent Application No. 2022-072209 filed on Apr. 26, 2022. The entire content of the priority application is incorporated herein by reference.

BACKGROUND ART

The following disclosure relates to a steering control device.

A known steering control device is configured to execute a vehicle-speed responsive control in which a transmission ratio (gear ratio) between an operation angle of a steering wheel and a steering angle of a steerable wheel is calculated based on a vehicle speed. In the vehicle-speed responsive control, the transmission ratio is large in a low-speed range while the transmission ratio is small in a high-speed range. For instance, Japanese Patent Application Publication No. 2020-29194 describes a steering control device configured to determine the transmission ratio based on the vehicle-speed responsive control.

SUMMARY

In a steer-by-wire system in which an operation member such as the steering wheel and a steering device are not mechanically coupled to each other, two calculators (such as microcomputers) are mounted on one ECU in some cases for ensuring redundancy of the system. The two calculators in such a redundant configuration execute calculation processing independently of each other. Even in a case where one of the two calculators fails, a steering control can be continuously executed by the other of the two calculators. In the redundant configuration, the results of calculations respectively performed by the two calculators are compared between the two calculators. Also in the vehicle-speed responsive control, the calculated transmission ratios, etc., are compared. In a case where information (vehicle speed information) input to one of the two calculators is determined to be abnormal in the comparison in the vehicle-speed responsive control, there may be generated a great difference between the calculation results of the two calculators, making is difficult to determine the transmission ratio.

Accordingly, an aspect of the present disclosure is directed to a steering control device capable of continuing a steering control with high stability even when vehicle speed information input to any one of calculators in a redundant configuration is abnormal.

In one aspect of the present disclosure, a steering control device is configured to control a steering device that is configured to change a transmission ratio between an operation angle of an operation member and a steering angle of a steerable wheel by an operation of a steering motor. The steering control device includes: a plurality of communication lines configured to transmit vehicle speed information that is information on a vehicle speed; and a plurality of calculators communicably connected to each other. The calculators are individually connected to the respective communication lines. Each of the calculators is configured to calculate the transmission ratio based on the vehicle speed information received via a corresponding one of the communication lines. Each of the calculators is configured to determine whether the received vehicle speed information is valid. When at least one of the calculators determines that the vehicle speed information is not valid, each of the calculators changes a calculation control for calculating the transmission ratio from a vehicle-speed responsive control in which the transmission ratio is calculated based on the vehicle speed information to a specific control in which the transmission ratio is calculated not based on the vehicle speed information.

In a case where one of a plurality of communication lines suffers from a failure such as a break, there is a possibility that the vehicle speed information transmitted via the failed communication line is not valid. According to the present disclosure, if the vehicle speed information that is not valid is transmitted by part of the communication lines and at least one calculator detects the abnormality, the calculation control (the calculation method) of the transmission ratio is switched from the vehicle-speed responsive control to the specific control in all the calculators. This configuration enables the transmission ratio to be calculated in each of the calculators without depending on the vehicle speed information, thus preventing the calculation control of the transmission ratio from becoming unstable and complicated. For instance, the response of the calculation processing is prevented from being lowered. That is, even when the vehicle speed information is abnormal, the transmission ratio is calculated without utilizing the vehicle speed information, thus enabling the steering control to be continued without confusion in control. According to the present disclosure, the steering control can be continued with high stability even when the vehicle speed information input to any one of the calculators in the redundant configuration is abnormal.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION

Referring to the drawings, there will be hereinafter described in detail a steering control device 11 according to one embodiment of the present disclosure. It is to be understood that the present disclosure is not limited to the details of the following embodiment but may be embodied with various changes and modifications based on the knowledge of those skilled in the art.

Figure 1:
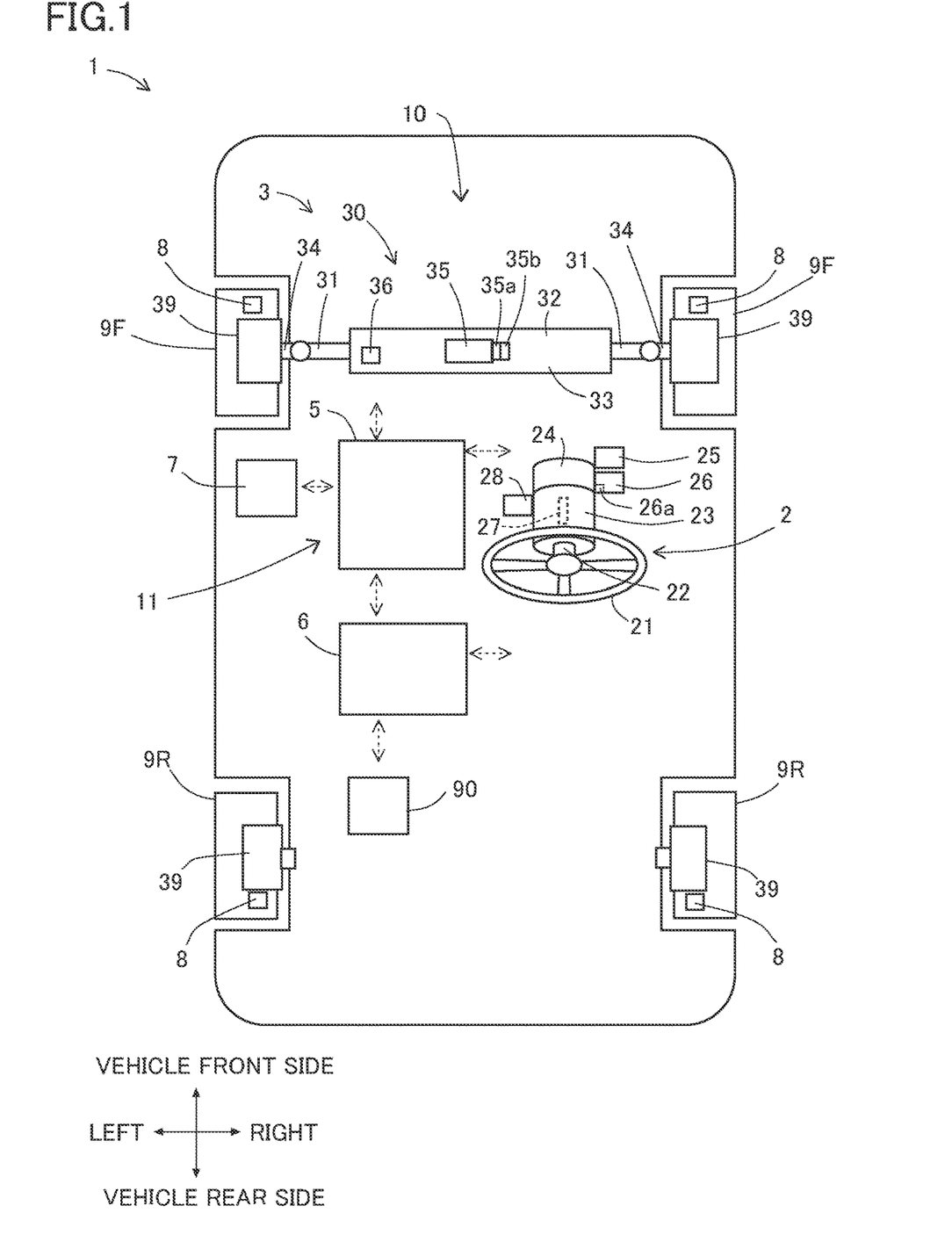
FIG. 1 is a view illustrating a configuration of a of steering system including a steering control device according to one embodiment of the present disclosure.

As illustrated in FIG. 1, the steering control device 11 controls a steering device 10 configured to change a transmission ratio between an operation angle of a steering wheel 21 functioning as an operation member and a steering angle of front wheels 9F, each of which is a steerable wheel, by an operation of a steering motor 35. The steering device 10 and the steering control device 11 that controls the steering device 10 constitute a steering system 1. The steering system 1 is of a steer-by-wire type.

Steering Device

The steering device 10 includes an operation device 2 and a steering device 3, which are mechanically independent of each other. The steering device 3 steers a pair of front wheels 9F, each of which is a steerable wheel. Hereinafter, the front wheels 9F and rear wheels 9R will be each referred to as a wheel 9 where appropriate. In the present embodiment, the rear wheels 9R are drive wheels. Each of the wheels 9 is provided with a wheel speed sensor 8 for detecting a wheel speed. Each wheel speed sensor 8 corresponds to a sensor for detecting information on a vehicle speed.

The operation device 2 includes: the steering wheel 21 (as one example of an operation member) operable by a driver; a steering shaft 22 to one end of which is attached the steering wheel 21; a steering column 23 rotatably holding the steering shaft 22 and supported by an instrument panel reinforcement (not illustrated); a reaction force applying mechanism 24; and an operation angle sensor 25.

The reaction force applying mechanism 24 is configured to apply, to the steering wheel 21 via the steering shaft 22, a reaction force against a steering operation by utilizing, as a force generation source, a reaction force motor 26 supported by the steering column 23. The reaction force motor 26 is an electric motor. The reaction force against the steering operation will be hereinafter referred to as "operation reaction force" where appropriate. The reaction force applying mechanism 24 has an ordinary configuration including a speed reducer, etc. The reaction force motor 26 is provided with a rotational angle sensor 26a. The operation angle sensor 25 is configured to detect an operation angle of the steering wheel 21 as a steering operation amount.

In the steering system 1, a torsion bar 27 is incorporated in the steering shaft 22, as in typical power steering systems. The operation device 2 includes an operation torque sensor 28 for detecting an operation torque based on a torsional amount of the torsion bar 27. The operation torque corresponds to an operation force applied to the steering wheel 21 by the driver.

The wheels 9 are supported by a body of the vehicle via respective steering knuckles 39 such that the wheels 9 are turnable or steerable. Each steering knuckle 39 is a constituent element of a corresponding one of suspension devices. The steering device 3 rotates the steering knuckles 39 to thereby steer the front wheels 9F together. The steering device 3 includes a steering actuator 30 as a main constituent element.

The steering actuator 30 includes a steering rod 31, a housing 32, a rod moving mechanism 33, and a steering motor 35. The steering rod 31, which is also referred to as a rack bar, has opposite ends coupled to the right and left steering knuckles 39 via respective link rods 34. The housing 32 is fixedly held by the vehicle body and supports the steering rod 31 movably in the right-left direction.

The rod moving mechanism 33 is configured to move the steering rod 31 in the right-left direction utilizing the steering motor 35 as a drive source. The steering motor 35 is an electric motor. The rod moving mechanism 33 is constituted principally by a ball screw mechanism including a ball groove formed on the steering rod 31 and a nut that is in engagement with the ball groove via bearing balls and that is rotated by the steering motor 35. The rod moving mechanism 33 has an ordinary configuration, a detailed description of which is dispensed with.

The steering motor 35 is provided with a rotational angle sensor 35a and a current sensor 35b for detecting a current supplied to the steering motor 35. The steering device 3 includes a steering angle sensor 36 for detecting an amount of the movement of the steering rod 31 in the right-left direction from its neutral position to thereby detect a steering angle, i.e., a steering amount, of the front wheels 9F. Thus, the steering device 3 is mechanically independent of the operation force of the steering wheel 21 and constitutes a steering device of a steer-by-wire type for steering the front wheels 9F based on the force of the steering motor 35.

Steering Control Device

Figure 2:
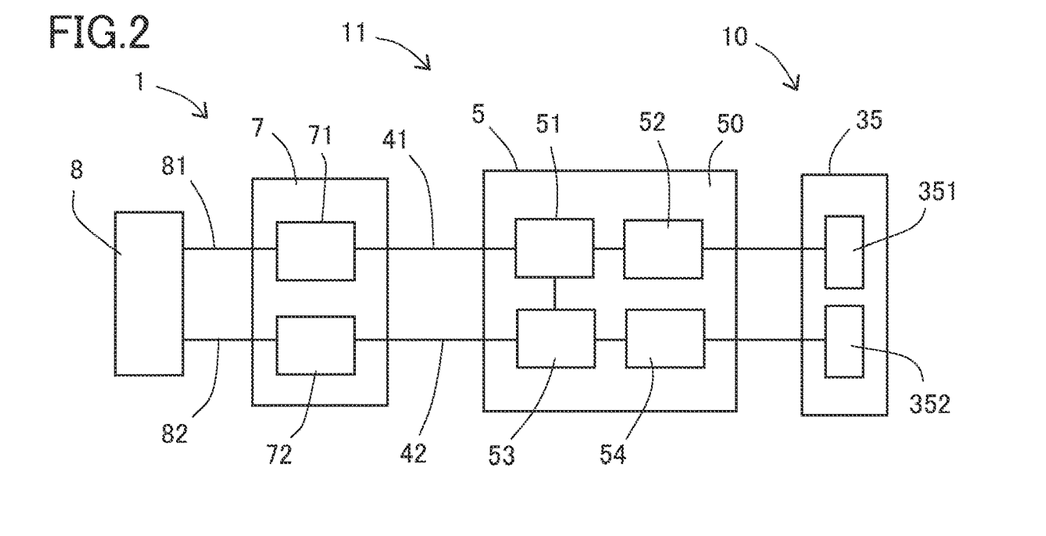
FIG. 2 is a view illustrating a configuration of the steering control device according to the embodiment.

As illustrated in FIG. 2, the steering control device 11 includes a first communication line 41, a second communication line 42, and a steering ECU 5 configured to control the steering device 3 based on a steering request. Each of the first communication line 41 and the second communication line 42 (hereinafter referred to as "communication line 41" and "communication line 42" where appropriate) is a wire (communication bus) for transmitting vehicle speed information relating to the vehicle speed. Specifically, each of the communication lines 41, 42 is a communication line connecting the steering ECU 5 and an ECU 7. The ECU 7 is an electronic control unit including, for instance, at least one processor and at least one memory.

The ECU 7 corresponds to a vehicle-speed calculator configured to calculate a vehicle speed based on the detection values of the wheel speed sensors 8. For instance, the ECU 7 is a brake ECU for controlling a braking force. The ECU 7 regularly calculates the vehicle speed based on the wheel speeds. The detection value of each of the wheel speed sensors 8 provided for the respective wheels 9 is input to the ECU 7 via sensor communication lines 81, 82.

In the present embodiment, each wheel speed sensor 8 is connected to a microcomputer 71 (corresponding to a first vehicle-speed calculator) of the ECU 7 via the sensor communication line 81 and to a microcomputer 72 (corresponding to a second vehicle-speed calculator) of the ECU 7 via the sensor communication line 82. Each of the microcomputers 71, 72 of the ECU 7 calculates the vehicle speed based on the detection values of the plurality of wheel speed sensors 8. Like the steering ECU 5, the ECU 7 has a redundant configuration that includes a plurality of microcomputers (calculators) 71, 72 capable of performing calculation processing independently of each other. The microcomputers 71, 72 calculate the vehicle speed independently of each other and control the braking force.

The microcomputer 71 is connected to a first microcomputer 51 of the steering ECU 5 via the first communication line 41. The microcomputer 71 transmits first vehicle-speed information that is a calculation result to the first microcomputer 51 via the first communication line 41. The microcomputer 72 is connected to a second microcomputer 53 of the steering ECU 5 via the second communication line 42. The microcomputer 72 transmits second vehicle-speed information that is a calculation result to the second microcomputer 53 via the second communication line 42.

In some cases, the first vehicle-speed information and the second vehicle-speed information are mutually different values and transmitted at mutually different timings due to execution of the calculation processing of the vehicle speed by individual microcomputers, the communication status, or the influence resulting from a difference in the condition of the communication lines such as a difference in length. In a configuration in which only one microcomputer for calculating the vehicle speed is disposed in the ECU 7 and the same vehicle speed information is output simultaneously from the one the microcomputer to both the communication lines 41, 42, the vehicle speed information received by the microcomputer 51 and the vehicle speed information received by the microcomputer 53 may be mutually different values depending upon the condition of the communication lines 41, 42 such as the presence or absence of a break.

The steering ECU 5 is an electronic control unit including a plurality of processors and a plurality of memories. The steering ECU 5 is communicably connected to each ECU, each sensor, etc., via communication lines (not illustrated). A CAN (car area network or controllable area network) is used for communication in the vehicle. The vehicle in the present embodiment is equipped with an automated driving ECU 90 configured to execute a control relating to automated driving. The vehicle is further equipped with various sensors such as the wheel speed sensors 8 and an acceleration sensor.

The steering ECU 5 executes a steering control for steering the front wheels 9F based on a steering request, namely, based on the operation angle of the steering wheel 21 in manual driving or based on a command from the automated driving ECU 90 in automated driving. The steering ECU 5 obtains the operation angle of the steering wheel 21 based on a rotational angle of the reaction force motor 26 detected by the rotational angle sensor 26a. Based on the operation angle, the steering ECU 5 determines a target front-wheel steering angle, which is a target of the steering angle of the front wheels 9F.

Based on the target front-wheel steering angle, the steering ECU 5 determines a target rotational angle, which is a target of a rotational angle of the steering motor 35. The steering ECU 5 detects an actual rotational angle of the steering motor 35 via the rotational angle sensor 35a and determines a rotational angle deviation, which is a deviation of the actual rotational angle with respect to the target rotational angle. Here, a torque generated by the steering motor 35 is referred to as a steering torque. The steering ECU 5 determines the steering torque to be generated, according to a feedback control law based on the rotational angle deviation. Each of the first microcomputer 51 and the second microcomputer 53 of the steering ECU 5 performs the calculation described above.

Here, a current supplied to the steering motor 35 is referred to as a steering current. The steering torque and the steering current are substantially proportional to each other. According to the relationship, the steering ECU 5 determines the steering current to be supplied to the steering motor 35 based on the steering torque determined as described above and supplies the steering current to the steering motor 35. The configuration of the steering ECU 5 relating to the supply of the steering current will be later described.

The steering system 1 further includes a reaction force ECU 6 configured to execute a reaction force control for giving, to the driver, an operation feeling with respect to the steering operation. The reaction force ECU 6 determines the operation reaction force based on two components, i.e., a steering-load-dependent component FS and an operation-force-dependent reduction component FA. The steering-load-dependent component FS is a component relating to a steering force (the steering torque of the steering motor 35) necessary for steering the front wheels 9F. The steering-load-dependent component FS is determined based on the steering current being supplied to the steering motor 35. Though not described in detail, it is recognized that the steering load of the front wheels 9F increases with an increase in the current value of the steering current, and the steering-load-dependent component FS is determined to be a greater value.

The operation-force-dependent reduction component FA may be considered as a component for giving, to the driver, an operation feeling in what is called power steering system. In the power steering system, an assist torque corresponding to the operation torque is applied to the steering shaft 22. The reaction force ECU 6 detects the operation torque via the operation torque sensor 28. Based on the operation reaction force, the reaction force ECU 6 determines a reaction force current, which is a current to be supplied to the reaction force motor 26. The reaction force ECU 6 supplies the determined reaction force current to the reaction force motor 26.

Detailed Configuration of Steering ECU

The steering ECU 5 includes a board 50, the first microcomputer 51, a first drive circuit 52, the second microcomputer 53, and a second drive circuit 54. The first microcomputer 51 functions as a first calculator, and the second microcomputer 53 functions as a second calculator. The first microcomputer 51 is a microcomputer including, for instance, at least one processor and at least one memory. The first microcomputer 51 is disposed on the board 50 and determines a current value of a first steering current to be supplied to the steering motor 35 via the first drive circuit 52. The first microcomputer 51 controls the first drive circuit 52 according to PWM control such that the first steering current is supplied to the steering motor 35.

The first drive circuit 52 is a motor drive circuit for driving the steering motor 35 and includes a plurality of switching elements corresponding to the three phases of the steering motor 35. The first drive circuit 52 is disposed on the board 50 and communicably connected to the first microcomputer 51. The first drive circuit 52 supplies an electric power of a battery (not illustrated) to the steering motor 35 based on the control of the first microcomputer 51.

Like the first microcomputer 51, the second microcomputer 53 is a microcomputer disposed on the board 50 and including, for instance, at least one processor and at least one memory. The second microcomputer 53 determines a current value of a second steering current to be supplied to the steering motor 35 via the second drive circuit 54. The second microcomputer 53 controls the second drive circuit 54 according to PWM control such that the second steering current is supplied to the steering motor 35. The first microcomputer 51 and the second microcomputer 53 are communicably connected to each other.

The second drive circuit 54 is a motor drive circuit for driving the steering motor 35 and includes a plurality of switching elements corresponding to the three phases of the steering motor 35. The second drive circuit 54 is disposed on the board 50 and communicably connected to the second microcomputer 53. The second drive circuit 54 supplies the electric power of the battery (not illustrated) to the steering motor 35 based on the control of the second microcomputer 53.

The steering motor 35 is a double-winding electric motor including a winding wire 351 connected to the first drive circuit 52 and a winding wire 352 connected to the second drive circuit 54. That is, the steering motor 35 is configured to output the steering torque corresponding to a sum of the first steering current supplied from the first drive circuit 52 and the second steering current supplied from the second drive circuit 54. The sum of the first steering current and the second steering current may be referred to as a total steering current. The steering current supplied from the battery via the steering ECU 5 is a sum of the first steering current and the second steering current.

As described above, the first drive circuit 52 and the second drive circuit 54 (hereinafter simply referred to as "drive circuits 52, 54" where appropriate) individually correspond to the respective microcomputers 51, 53 and supply the respective steering currents to the steering motor 35 under control of the corresponding microcomputers 51, 53. The microcomputers 51, 53 are communicably connected to each other, individually connected to the corresponding communication lines 41, 42, and respectively calculate the transmission ratio based on the vehicle speed information received via the corresponding communication lines 41, 42. The communication lines 41, 42 transmit vehicle speed information, which is information on the vehicle speed, independently of each other. In the present embodiment, the first communication line 41 connects the first microcomputer 51 and the microcomputer 71, and the second communication line 42 connects the second microcomputer 53 and the microcomputer 72.

Calculation Control of Transmission Ratio

The first microcomputer 51 is connected to the first communication line 41 and obtains the first vehicle-speed information via the first communication line 41. The second microcomputer 53 is connected to the second communication line 42 and obtains the second vehicle-speed information via the second communication line 42. The first communication line 41 and the second communication line 42 are independent of each other.

Figure 3:
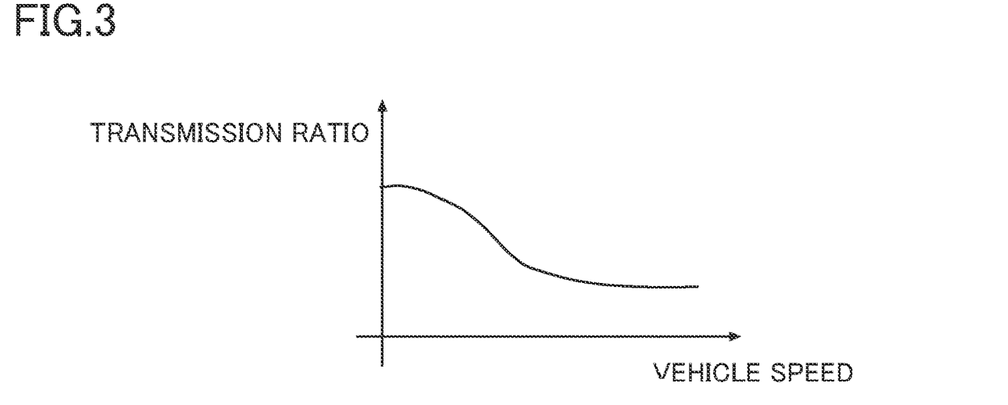
FIG. 3 is a view illustrating a relationship between a vehicle speed and a transmission ratio in a vehicle-speed responsive control in the embodiment.

In calculating the steering current, each of the first microcomputer 51 and the second microcomputer 53 calculates a transmission ratio (gear ratio) between the operation angle of the steering wheel 21 and the steering angle of the front wheels 9F. The transmission ratio is calculated based on the input vehicle speed information. As illustrated in FIG. 3, the relationship between the vehicle speed and the transmission ratio is set in advance and stored in the microcomputers 51, 53 as a first map. The first map is used in a vehicle-speed responsive control. According to the first map, the transmission ratio is determined if the vehicle speed is determined. The vehicle-speed responsive control is a calculation control in which the transmission ratio is calculated based on the vehicle speed information. In the vehicle-speed responsive control, the higher the vehicle speed, the smaller the transmission ratio.

In the vehicle-speed responsive control, each of the microcomputers 51, 53 calculates the transmission ratio based on the vehicle speed information input thereto. The information on the calculation result by the microcomputer 51 and the information on the calculation result by the microcomputer 53 are communicated between the microcomputers 51, 53. When a difference between a first transmission ratio calculated by the first microcomputer 51 and a second transmission ratio calculated by the second microcomputer 53 (hereinafter referred to as a "transmission-ratio calculation difference" where appropriate) is less than a predetermined calculation difference threshold, each of the microcomputers 51, 53 sets the first transmission ratio as the transmission ratio common to both the microcomputers 51, 53. Each microcomputer 51, 53 uses the common transmission ratio, i.e., the first transmission ratio. A communication system connected to the first microcomputer 51 will be referred to as a first communication system, and a communication system connected to the second microcomputer 53 will be referred to as a second communication system.

Figure 4:
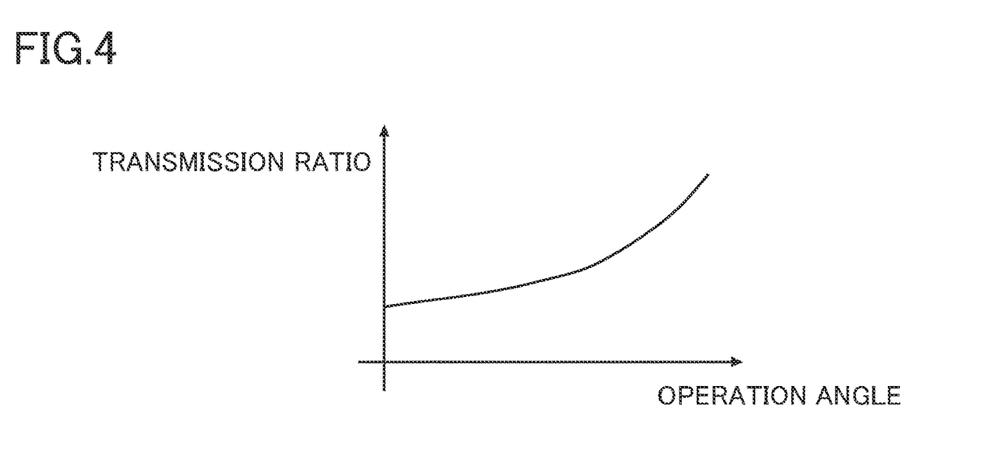
FIG. 4 is a view illustrating a relationship between an operation angle and the transmission ratio in an operation-angle responsive control in the embodiment.

Each microcomputer 51, 53 determines whether the received vehicle speed information is valid. When at least one of the microcomputers 51, 53 determines that the vehicle speed information is not valid, each microcomputer 51, 53 switches the calculation control of the transmission ratio from the vehicle-speed responsive control in which the transmission ratio is calculated based on the vehicle speed information to a specific control in which the transmission ratio is calculated not based on the vehicle speed information. As illustrated in FIG. 4, the specific control in the present embodiment is an operation-angle responsive control in which the transmission ratio is calculated based on the operation angle. Each microcomputer 51, 53 stores, in advance, a second map that represents a relationship between the operation angle and the transmission ratio. The second map is a map used in the operation-angle responsive control. According to the second map, the transmission ratio is determined if the operation angle is determined. In the operation-angle responsive control, the greater the operation angle, the greater the transmission ratio.

When a difference between the vehicle speed information received by the first microcomputer 51 and the vehicle speed information received by the second microcomputer 53 (hereinafter referred to as a "vehicle-speed-information difference" where appropriate) is not less than a predetermined vehicle-speed-difference threshold, each microcomputer 51, 53 determines that one of the vehicle speed information received by the first microcomputer 51 and the vehicle speed information received by the second microcomputer 53 is abnormal, namely, not valid. In a case where one of the communication lines 41, 42 suffers from a failure such as a break or in a case where one of the microcomputers 71, 72 of the ECU 7 fails, the vehicle speed information transmitted in a failed one of the two systems may probably be an abnormal value. In this instance, one of the vehicle speed information received by the first microcomputer 51 and the vehicle speed information received by the second microcomputer 53 is an abnormal value while the other vehicle speed information is a correct value. This causes a great vehicle-speed-information difference. Thus, when the vehicle-speed-information difference is not less than the vehicle-speed-difference threshold, each microcomputer 51, 53 determines that one of the vehicle speed information received by the first microcomputer 51 and the vehicle speed information received by the second microcomputer 53 is abnormal. The two sets of the vehicle speed information, for which the vehicle-speed-information difference is calculated, are calculation values obtained based on, for instance, the detection values detected by the wheel speed sensors 8 at the same timing. For instance, the two sets of the vehicle speed information to be compared are calculated based on the same basis (the same detection value).

One example of settings for information transmission and reception is as follows. The first microcomputer 51 transmits the vehicle speed information to the second microcomputer 53 upon reception of the vehicle speed information from the first communication line 41. The second microcomputer 53 transmits the vehicle speed information to the first microcomputer 51 upon reception of the vehicle speed information from the second communication line 42. One of the microcomputers 51, 53 that has determined whether the vehicle speed information is valid or invalid transmits the result of determination to the other of the microcomputers 51, 53 upon completion of the determination. The timing of determination by the microcomputer 51 and the timing of determination by the microcomputer 53 can be the same depending on the transmission and reception timing of the vehicle speed information by each microcomputer 51, 53.

In a case where each microcomputer 51, 53 is capable of recognizing a failure of a corresponding one of the microcomputers 71,72 in the ECU 7 or a failure of a corresponding one of the communication lines 41, 42 (such as a break or congestion) based on the output signal of the ECU 7 that calculates the vehicle speed, each microcomputer 51, 53 may determine whether the vehicle speed information is valid or invalid based on the output signal of the ECU 7. In a case where each microcomputer 51, 53 is configured to regularly receive the signal from the ECU 7 (e.g., from a corresponding one of the microcomputers 71, 72), the microcomputer 51, 53 can recognize an abnormality in the corresponding microcomputer or in the corresponding communication line based on the fact that the signal fails to be received by the microcomputer 51, 53.

When at least one of the microcomputers 51, 53 determines, according to any of the determination methods described above, that one of the two sets of the vehicle speed information is not valid, the microcomputers 51, 53 share the determination result, and the calculation control (the calculation method) of the transmission ratio in both the microcomputers 51, 53 is changed from the vehicle-speed responsive control to the operation-angle responsive control. After the calculation control is changed to the operation-angle responsive control, each microcomputer 51, 53 calculates (determines) the transmission ratio based on the detection value of the operation angle sensor 25 and the second map. Similarly, the calculation control of the transmission ratio in both the microcomputers 51, 53 is changed from the vehicle-speed responsive control to the operation-angle responsive control also when the microcomputer 51 and the microcomputer 53 simultaneously determine that one of the two sets of the vehicle speed information is not valid. Thus, when at least one of the microcomputers 51, 53 determines that the vehicle speed information is not valid, the calculation control of the transmission ratio in both the microcomputers 51, 53 is set to the operation-angle responsive control.

Figure 5:
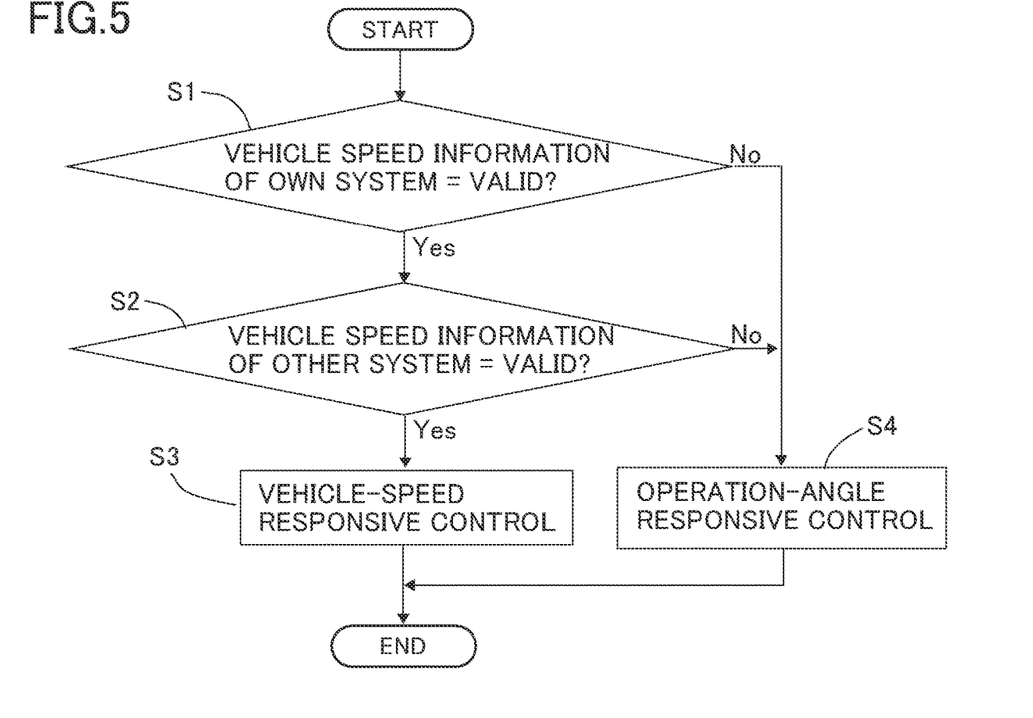
FIG. 5 is a flowchart representing one example of control processing in the embodiment.

Referring to FIG. 5, there will be described one example of the processing executed by each microcomputer 51, 53. Each microcomputer 51, 53 determines whether the vehicle speed information of its own system is valid (S1). When the vehicle speed information of the own system is valid (S1: Yes), the microcomputer 51, 53 determines whether the vehicle speed information of the other system is valid (S2). When the vehicle speed information of the other system is valid (S2: Yes), each microcomputer 51, 53 calculates the transmission ratio according to the vehicle-speed responsive control (S3). In a case where each microcomputer 51, 53 determines the validity of the vehicle speed information based on the vehicle-speed-information difference, Steps S1 and S2 are simultaneously executed. In this case, it can be said that each microcomputer 51, 53 determines, in one step, whether both the vehicle speed information of the own system and the vehicle information of the other system are valid, namely, whether both the vehicle speed information received by the microcomputer 51 and the vehicle speed information received by the microcomputer 53 are valid. Each microcomputer 51, 53 continues the vehicle-speed responsive control as long as it is not determined that the vehicle speed information is invalid.

When it is determined, in one of Steps S1 and S2, that the vehicle speed information is not valid, namely, invalid, (S1: No or S2: No), each microcomputer 51, 53 changes the calculation control of the transmission ratio to the operation-angle responsive control and calculates the transmission ratio according to the operation-angle responsive control (S4). Thus, when it is determined, in at least one of the two systems, that the vehicle speed information is invalid, the calculation control of the transmission ratio is changed to the operation-angle responsive control in both the microcomputers 51, 53.

Advantageous Effects of Present Embodiment

In a case where one of the plurality of communication lines suffers from a failure such as a break, there is a possibility that the vehicle speed information transmitted via the failed communication line is not valid. According to the present embodiment, if the vehicle speed information that is not valid is transmitted by one of the communication lines 41, 42 and at least one of the microcomputers 51, 53 detects the abnormality, the calculation control (the calculation method) of the transmission ratio is switched from the vehicle-speed responsive control to the specific control in both the microcomputers 51, 53. This configuration enables the transmission ratio to be calculated in each of the microcomputers 51, 53 not based on the vehicle speed information, thus preventing the calculation control of the transmission ratio from becoming unstable and complicated due to a great difference in the vehicle speed information between the microcomputers 51, 53. For instance, the response of the calculation processing is prevented from being lowered. That is, even when the vehicle speed information is abnormal, the transmission ratio is calculated without utilizing the vehicle speed information, thus enabling the steering control to be continued without confusion in control. According to the present embodiment, the steering control can be continued with high stability even when the vehicle speed information input to any one of the microcomputers in the redundant configuration is abnormal.

In the present embodiment, the specific control is set to the operation-angle responsive control. In the operation-angle responsive control, the greater the operation angle, the greater the transmission ratio. In this respect, the driver increases the operation angle mostly in low-speed traveling. As a consequence, before and after the switching of the calculation control from the vehicle-speed responsive control to the operation-angle responsive control, the transmission ratio is readily set so as to be similar to that in the vehicle-speed responsive control in which the lower the vehicle speed, the greater the transmission ratio. In high-speed traveling, the driver tends to operate the steering wheel 21 such that the operation angle is small. Thus, the transmission ratio in high-speed traveling is small both in the vehicle-speed responsive control and the operation-angle responsive control. Because the specific control is the operation-angle responsive control, this prevents the driver from feeling unnatural after the calculation control of the transmission ratio is changed. It is noted that the specific control may be a transmission ratio fixing control in which the transmission ratio is set to a fixed value. This control also does not use the vehicle speed information in the calculation of the transmission ratio, thus enabling the steering control to be continued without confusion in control.

Other Connection Examples of Communication Lines

Figure 6:
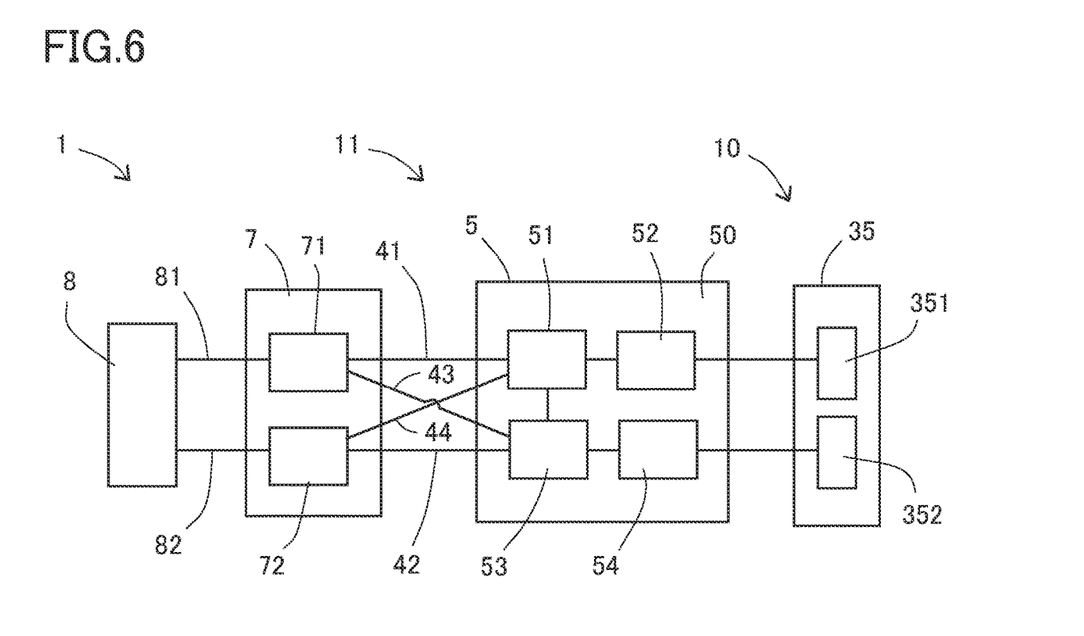
FIG. 6 is a view illustrating a configuration of the steering control device according to a modification.

The connection configuration of the communication lines for connecting the ECU 7 and the steering ECU 5 may be other configuration. As illustrated in FIG. 6, the steering control device 11 may include a first sub communication line 43 and a second sub communication line 44. The first sub communication line 43 connects the microcomputer 71 and the second microcomputer 53. The second sub communication line 44 connects the microcomputer 72 and the first microcomputer 51.

In this configuration, each microcomputer 51, 53 can receive the two sets of the vehicle speed information directly from the ECU 7. Thus, each microcomputer 51, 53 is configured such that one of the microcomputers 51, 53 can calculate the vehicle-speed-information difference without waiting for the other of the microcomputers 51, 53 to provide the vehicle speed information. Based on a difference between the vehicle speed information received from the first communication line 41 and the vehicle speed information received from the second sub communication line 44, the first microcomputer 51 determines whether both the two sets of the vehicle speed information are valid. Based on the vehicle speed information received from the second communication line 42 and the vehicle speed information received from the first sub communication line 43, the second microcomputer 53 determines whether both the two sets of the vehicle speed information are valid.

As described above, each microcomputer 51, 53 calculates a difference between the two sets of the vehicle speed information received from the ECU 7, i.e., the vehicle-speed-information difference, and determines whether one of the two sets of the vehicle speed information is not valid or whether both the two sets of the vehicle speed information are valid. Also in this configuration, when at least one of the microcomputers 51, 53 determines that one of the two sets of the vehicle speed information is not valid, the calculation control of the transmission ratio in both the microcomputers 51, 53 is changed to the operation-angle responsive control.

Modifications

Figure 7:
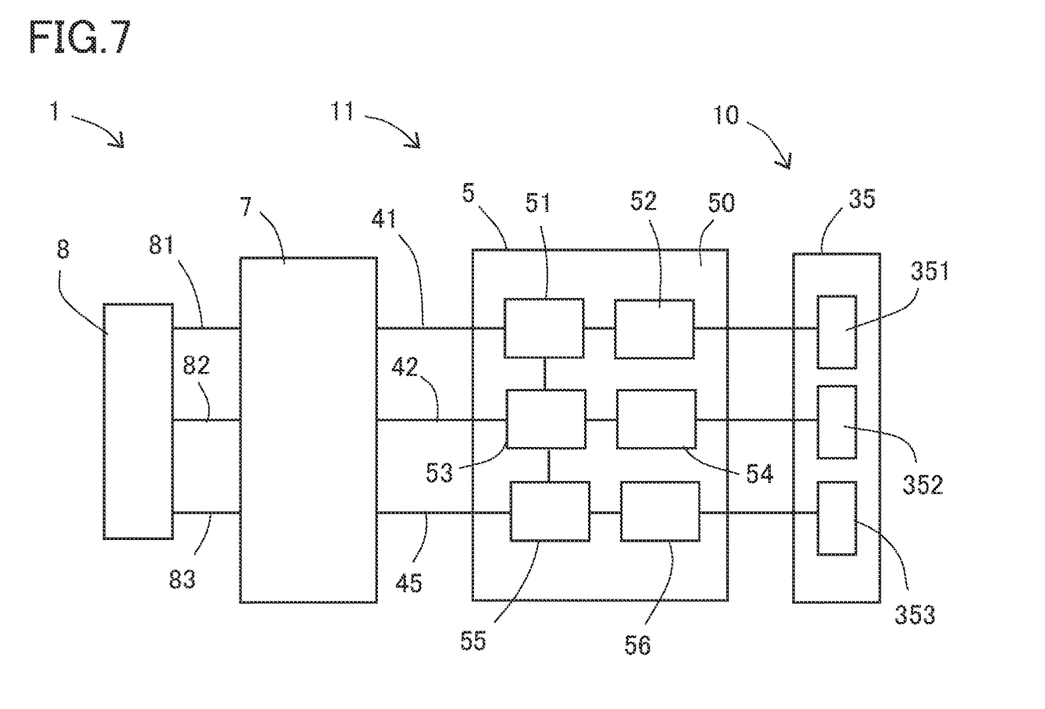
FIG. 7 is a view illustrating a configuration of the steering control device according to another modification.

The present disclosure is not limited to the configuration of the embodiment illustrated above. For instance, the steering ECU 5 may include three or more microcomputers (calculators). Also in this configuration, each of the plurality of microcomputers is configured to determine whether the received vehicle speed information is valid and to change the calculation control of the transmission ratio from the vehicle-speed responsive control to the specific control when at least one of the plurality of microcomputers determines that the vehicle speed information is not valid. In a case where a redundant configuration is constituted by three microcomputers in the steering ECU 5 as illustrated in FIG. 7, for instance, the steering ECU 5 may additionally include a third microcomputer 55 and a third drive circuit 56, and the third microcomputer 55 and the ECU 7 may be connected by a third communication line 45. Each wheel speed sensor 8 and the ECU 7 may be connected by a sensor communication line 83. The ECU 7 may include three microcomputers corresponding to the three microcomputers of the steering ECU 5.

The steering control device 11 may include a plurality of ECUs as the plurality of calculators. That is, the calculator is not limited to the microcomputer but may be an ECU. Also in this case, the plurality of ECUs is communicably connected to each other. That is, the redundant configuration may be constituted by the plurality of microcomputers or may be constituted by the plurality of ECUs. The redundant configuration is a configuration in which mutually different sets of the vehicle speed information having mutually different values can be input at different timings to two or more calculators (such as microcomputers or ECUs) that are configured to perform the transmission ratio calculation.

The vehicle speed information input to each microcomputer 51, 53 need not necessarily be the information calculated by the ECU 7 but may be information relating to the vehicle speed. The ECU 7 is not limited to the brake ECU but may be other ECU having a function of calculating the vehicle speed. The ECU 7 may include only one calculator, namely, only one microcomputer. In a case where the detection value of the wheel speed sensor 8 (the information on the vehicle speed) is input to the steering ECU 5 via the communication lines 41, 42, each microcomputer 51, 53 may calculate the vehicle speed. In this instance, each microcomputer 51, 53 may compare the detection value of the wheel speed sensor 8 input to one of the microcomputers 51, 53 and the detection value of the wheel speed sensor 8 input to the other of the microcomputers 51, 53 and may determine whether one of the detection values is valid or invalid based on the result of comparison. Each microcomputer 51, 53 may calculate the vehicle speed, may compare the calculation result (the vehicle speed information) obtained by one of the microcomputers 51, 53 and the calculation result (the vehicle speed information) obtained by the other of the microcomputers 51, 53, and may determine whether one of the calculation results is valid or invalid based on the result of comparison. Thus, each microcomputer 51, 53 may obtain the vehicle speed information not via the ECU 7. The steering device 3 may be configured to steer the rear wheels 9R. The steering device 10 is not limited to the steer-by-wire type but may be any type in which the transmission ratio is variable.

Forms

The present disclosure includes the following forms.

(1) A steering control device configured to control a steering device that is configured to change a transmission ratio between an operation angle of an operation member and a steering angle of a steerable wheel by an operation of a steering motor, the steering control device including: a plurality of communication lines configured to transmit vehicle speed information that is information on a vehicle speed; and a plurality of calculators communicably connected to each other, the calculators being individually connected to the respective communication lines, each of the calculators being configured to calculate the transmission ratio based on the vehicle speed information received via a corresponding one of the communication lines, wherein each of the calculators is configured to determine whether the received vehicle speed information is valid, wherein, when at least one of the calculators determines that the vehicle speed information is not valid, each of the calculators changes a calculation control for calculating the transmission ratio from a vehicle-speed responsive control in which the transmission ratio is calculated based on the vehicle speed information to a specific control in which the transmission ratio is calculated not based on the vehicle speed information.

(2) The steering control device according to the form (1), wherein the specific control is an operation-angle responsive control in which the transmission ratio is calculated based on the operation angle.

(3) The steering control device according to the form (1) or (2), further including: a wheel speed sensor configured to detect a wheel speed; and a vehicle-speed calculator configured to calculate the vehicle speed based on a detection value of the wheel speed sensor, wherein the communication lines are connected to the vehicle-speed calculator.

(4) The steering control device according to any one of the forms (1)-(3), wherein each of the calculators is configured to determine whether the vehicle speed information is valid based on a difference between two sets of the vehicle speed information that are respectively transmitted via two of the communication lines including the communication line connected to itself.

(5) The steering control device according to any one of the forms (1)-(4), further including a plurality of drive circuits that individually correspond to the respective calculators, each of the drive circuits being controlled by a corresponding one of the calculators to supply a steering current to the steering motor.

(6) The steering control device according to the form (5), wherein the communication lines include a first communication line and a second communication line, wherein the calculators include a first calculator connected to the first communication line and a second calculator connected to the second communication line, and wherein the drive circuits include a first drive circuit connected to the first calculator and a second drive circuit connected to the second calculator.

(7) The steering control device according to the form (6), wherein, when a difference between the vehicle speed information transmitted via the first communication line and the vehicle speed information transmitted via the second communication line is not less than a predetermined threshold, each of the first calculator and the second calculator determines that one of the vehicle speed information transmitted via the first communication line and the vehicle speed information transmitted via the second communication line is not valid.

(8) The steering control device according to the form (6) or (7), further including: a wheel speed sensor configured to detect a wheel speed; a first vehicle-speed calculator configured to calculate the vehicle speed based on a detection value of the wheel speed sensor; and a second vehicle-speed calculator configured to calculate the vehicle speed based on the detection value of the wheel speed sensor, wherein the first communication line connects the first vehicle-speed calculator and the first calculator, and wherein the second communication line connects the second vehicle-speed calculator and the second calculator.

(9) The steering control device according to the form (8), wherein, when a difference between the vehicle speed information calculated by the first vehicle-speed calculator and the vehicle speed information calculated by the second vehicle-speed calculator is not less than a predetermined threshold, each of the first calculator and the second calculator determines that one of the vehicle speed information calculated by the first vehicle-speed calculator and the vehicle speed information calculated by the second vehicle-speed calculator is not valid.

(10) The steering control device according to the form (8) or (9), further including: a first sub communication line connecting the first vehicle-speed calculator and the second calculator; and a second sub communication line connecting the second vehicle-speed calculator and the first calculator.

What is claimed is:

1. A steering control device configured to control a steering device that is configured to change a transmission ratio between an operation angle of an operation member and a steering angle of a steerable wheel by an operation of a steering motor, the steering control device comprising:
    a plurality of communication lines configured to transmit vehicle speed information that is information on a vehicle speed; and
    a plurality of calculators communicably connected to each other, the calculators being individually connected to the respective communication lines, each of the calculators being configured to calculate the transmission ratio based on the vehicle speed information received via a corresponding one of the communication lines,
    wherein each of the calculators is configured to determine whether the received vehicle speed information is valid, and
    wherein, when at least one of the calculators determines that the vehicle speed information is not valid, each of the calculators changes a calculation control for calculating the transmission ratio from a vehicle-speed responsive control in which the transmission ratio is calculated based on the vehicle speed information to a specific control in which the transmission ratio is calculated not based on the vehicle speed information.

2. The steering control device according to claim 1, wherein the specific control is an operation-angle responsive control in which the transmission ratio is calculated based on the operation angle.

3. The steering control device according to claim 1, further comprising:
    a wheel speed sensor configured to detect a wheel speed; and
    a vehicle-speed calculator configured to calculate the vehicle speed based on a detection value of the wheel speed sensor,
    wherein the communication lines are connected to the vehicle-speed calculator.

4. The steering control device according to claim 1, wherein each of the calculators is configured to determine whether the vehicle speed information is valid based on a difference between two sets of the vehicle speed information that are respectively transmitted via two of the communication lines including the communication line connected to itself.

5. The steering control device according to claim 1, further comprising a plurality of drive circuits that individually correspond to the respective calculators, each of the drive circuits being controlled by a corresponding one of the calculators to supply a steering current to the steering motor.

6. The steering control device according to claim 5,
    wherein the communication lines include a first communication line and a second communication line,
    wherein the calculators include a first calculator connected to the first communication line and a second calculator connected to the second communication line, and
    wherein the drive circuits include a first drive circuit connected to the first calculator and a second drive circuit connected to the second calculator.

7. The steering control device according to claim 6, wherein, when a difference between the vehicle speed information transmitted via the first communication line and the vehicle speed information transmitted via the second communication line is not less than a predetermined threshold, each of the first calculator and the second calculator determines that one of the vehicle speed information transmitted via the first communication line and the vehicle speed information transmitted via the second communication line is not valid.

8. The steering control device according to claim 6, further comprising:
    a wheel speed sensor configured to detect a wheel speed;
    a first vehicle-speed calculator configured to calculate the vehicle speed based on a detection value of the wheel speed sensor; and a second vehicle-speed calculator configured to calculate the vehicle speed based on the detection value of the wheel speed sensor,
wherein the first communication line connects the first vehicle-speed calculator and the first calculator, and
wherein the second communication line connects the second vehicle-speed calculator and the second calculator.

9. The steering control device according to claim 8, wherein, when a difference between the vehicle speed information calculated by the first vehicle-speed calculator and the vehicle speed information calculated by the second vehicle-speed calculator is not less than a predetermined threshold, each of the first calculator and the second calculator determines that one of the vehicle speed information calculated by the first vehicle-speed calculator and the vehicle speed information calculated by the second vehicle-speed calculator is not valid.

10. The steering control device according to claim 9, further comprising:
a first sub communication line connecting the first vehicle-speed calculator and the second calculator; and
a second sub communication line connecting the second vehicle-speed calculator and the first calculator.

* * * * *